United States Patent [19]
Scott

[11] Patent Number: 6,043,854
[45] Date of Patent: Mar. 28, 2000

[54] VIDEO DISPLAY SYSTEM FOR A MOBILE SIMULATOR

[75] Inventor: Peter J. Scott, Shelton, Conn.

[73] Assignee: Sikorsky Aircraft Corporation, Strattford, Conn.

[21] Appl. No.: 09/018,702

[22] Filed: Feb. 4, 1998

[51] Int. Cl.[7] .............................. H04N 5/74; H04N 7/18; G09B 9/00
[52] U.S. Cl. .................. 348/744; 348/789; 348/121; 434/29; 434/69; 434/62; 353/119
[58] Field of Search ..................... 348/744, 756, 348/757, 759, 776, 781, 787, 789, 836, 837, 838, 121, 122, 123, 124; 434/29, 60, 62, 69; 353/119, 79; H04N 5/74, 9/31, 7/18

[56] References Cited

U.S. PATENT DOCUMENTS

| | | | |
|---|---|---|---|
| 4,634,384 | 1/1987 | Neves et al. ............................ | 348/123 |
| 5,137,450 | 8/1992 | Thomas ................................... | 434/44 |
| 5,509,806 | 4/1996 | Ellsworth ................................ | 434/29 |
| 5,919,045 | 7/1999 | Tagge et al. ........................... | 434/62 |
| 5,921,780 | 7/1999 | Myers ..................................... | 434/69 |

*Primary Examiner*—Michael H. Lee
*Attorney, Agent, or Firm*—Adam C. Solomon

[57] ABSTRACT

A video display system for a mobile simulator, comprising a shock-isolated projector assembly for projecting video images, a shock-isolated first mirror assembly disposed in combination with the projector assembly, a shock-isolated second mirror assembly disposed in combination with the first mirror assembly, and a shock-isolated screen assembly disposed in combination with the second mirror assembly, wherein the projector assembly, the first mirror assembly, the second mirror assembly, and the screen assembly are configured, in combination, such that the video images projected by the projector assembly are directed to the first mirror assembly, are reflected from the first mirror assembly to the second mirror assembly, and are subsequently reflected from the second mirror assembly onto the screen assembly.

5 Claims, 7 Drawing Sheets

VIDEO DISPLAY SYSTEM FOR A MOBILE SIMULATOR

RELATED APPLICATION

The present application is related to commonly-owned, co-pending, U.S. patent application entitled MOBILE MODULAR SIMULATOR SYSTEM (S-5303).

TECHNICAL FIELD

This invention relates generally to video display systems, and more particularly, to a video display system for a mobile simulator system.

BACKGROUND OF THE INVENTION

Computer-based simulators are increasingly used to assist in the development and testing of aircraft and land-based vehicles, and in particular, to assist in the training of pilots and operators. A typical computer-based simulator system for a helicopter comprises a helicopter cockpit fixed to a surface and disposed in combination with a display screen, video projection subsystem, and audio delivery subsystem. The video projection subsystem and audio delivery subsystem are electronically connected to a programmable computer subsystem that generates helicopter models, scenarios, images, and sounds for the simulations. In addition, the computer subsystem is electronically connected to the cockpit to receive input from the cockpit's flight controls, and to deliver data to the cockpit's flight instrumentation.

In the prior art, computer-based simulators are typically installed in conventional buildings to provide environmental controls and electrical power for the simulator subsystems, and also to provide access to the computer subsystems, which typically occupy large volumes of space. A drawback to prior art computer-based simulators is that these simulators are "fixed" and cannot be transported to new locations without first dismantling them. There is a need in certain simulator applications (e.g., battlefield simulations) to group multiple simulators together to carry-out accurate combined mission simulations. In addition, because the number of computer-based simulators are limited by their expensive nature, there is also a need to make a limited number of simulators accessible to large numbers of users in diverse geographic locations. The typical fixed computer-based simulator does not properly address these needs.

In U.S. Pat. No. 5,509,806, PORTABLE MULTIPLE MODULE SIMULATOR APPARATUS AND METHOD OF USE, granted to Ellsworth, and assigned to Crusade for Kids, Inc. (hereinafter '806 patent), a method and apparatus are disclosed for multimedia simulation of the sounds, sights, and motions associated with various real life experiences. Roadable trailers having modules are combined to form a platform or support for an exoskeleton in the shape of various structures such as a spaceship, moon base, cave, mountain, vehicle, airplane, helicopter, ship, submarine, etc. The modules are provided with cameras, viewing screens, audio equipment and actual and optical motion imparting mechanisms for real-time point-of-access imagery simulating take-off, landing, turns, and hover-type turns from the environment surrounding the simulator. External image gathering cameras are attached to a movable support to provide relative motion point-of-access imagery.

A drawback to the portable simulator disclosed in the '806 patent is that this type of portable simulator is designed primarily for entertainment use, and is not configured for fully-realistic simulator experiences. For example, the portable simulator disclosed in the '806 patent is not configured to receive a helicopter, aircraft, or tank cockpit, or a vehicle interior. However, even if such a cockpit or interior was placed within the portable simulator disclosed in the '806 patent, the cockpit/interior, and the corresponding computer equipment would be housed within one trailer. Therefore, although the entire simulator is portable, it still requires considerable disassembly of some simulator systems to remove/replace the cockpit, audio, video, or computer systems.

DISCLOSURE OF THE INVENTION

It is therefore an object of the present invention to provide a video display system for a mobile simulator.

Another object of the present invention is to provide a video display system for a mobile simulator that provides durability for surviving in a mobile environment.

These objects and others are achieved in the present invention by a video display system for a mobile simulator comprising a shock-isolated projector assembly for projecting video images, a shock-isolated first mirror assembly disposed in combination with the projector assembly, a shock-isolated second mirror assembly disposed in combination with the first mirror assembly, and a shock-isolated screen assembly disposed in combination with the second mirror assembly, wherein the projector assembly, the first mirror assembly, the second mirror assembly, and the screen assembly are configured, in combination, such that the video images projected by the projector assembly are directed to the first mirror assembly, are reflected from the first mirror assembly to the second mirror assembly, and are subsequently reflected from the second mirror assembly onto the screen assembly.

Still other objects and advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BEST MODE FOR CARRYING OUT THE INVENTION

Figure 1:
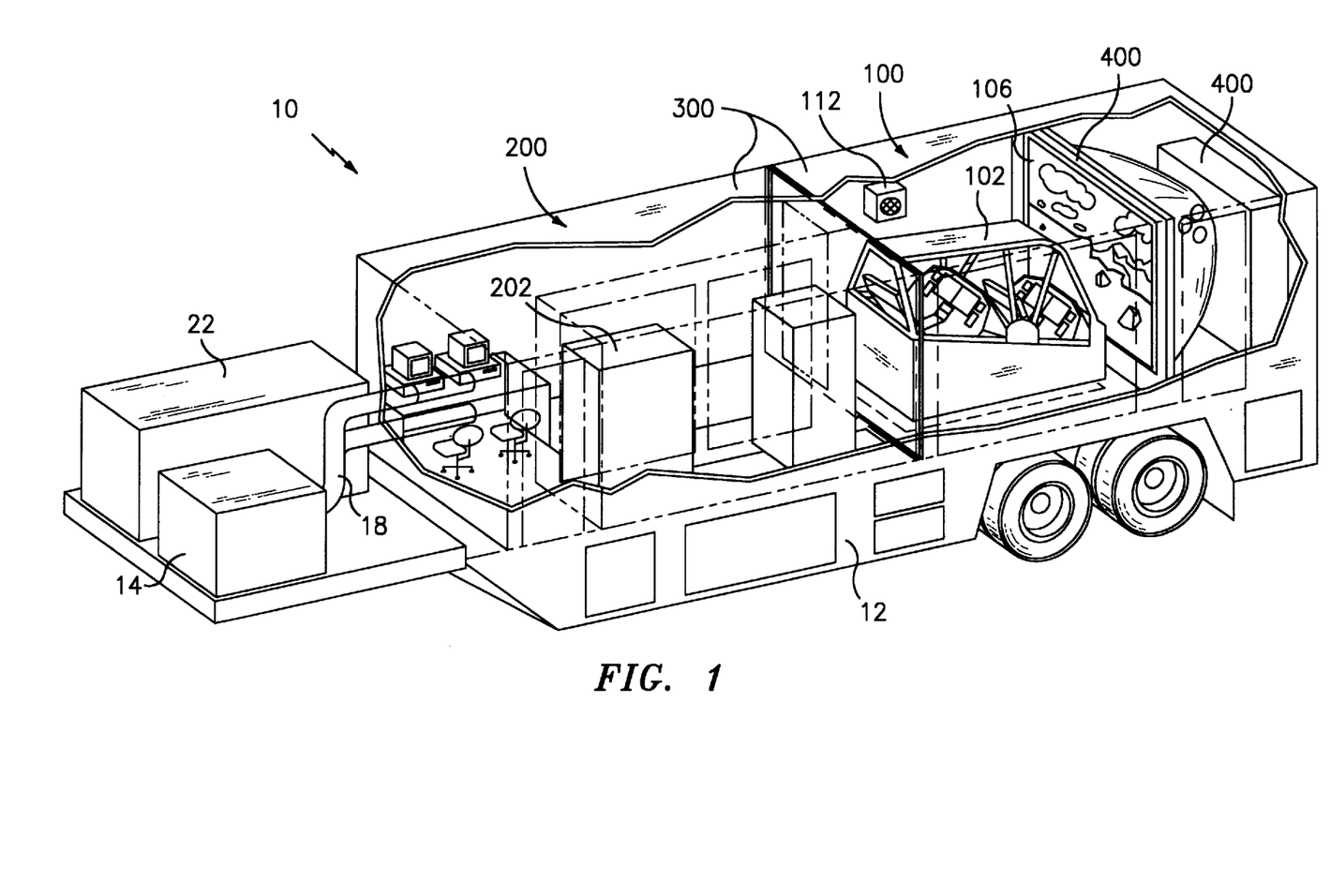
FIG. 1 is a perspective view, partly broken away, of a mobile modular simulator system embodying features of the present invention.
Figure 2:
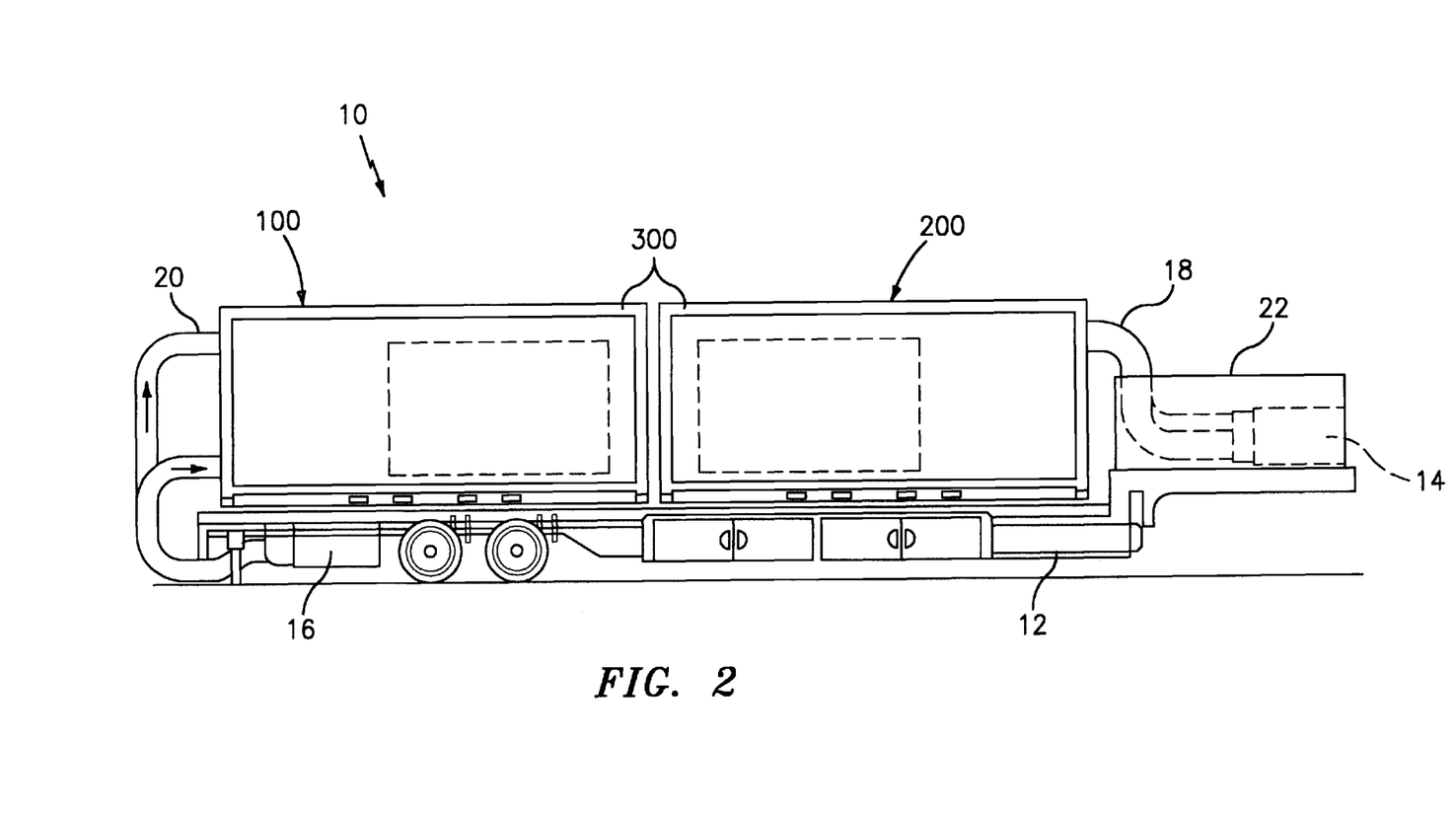
FIG. 2 is a side view of the mobile modular simulator of FIG. 1.

Referring now to the drawings wherein like reference characters identify corresponding or similar elements throughout the several views, FIGS. 1 and 2 depict a mobile modular simulator system 10 embodying features of the present invention. The mobile modular simulator system 10 comprises a mobile base 12, a multimedia subsystem module 100 demountably coupled with the mobile base 12, and a controller subsystem module 200 demountably coupled with the mobile base 12.

In the described embodiment, the mobile base 12 comprises a conventional roadable flatbed trailer of a type configured for connection to a truck cab (not shown). In alternative embodiments, the mobile base 12 can comprise a flatbed or platform disposed in combination with a land-based vehicle, rail car, barge, self-propelled seafaring ship, aircraft cargo hold, helicopter hoisting means, or any other means known in the art for facilitating land, sea, or airborne mobility of the mobile modular simulator system 10.

In the described embodiment, the multimedia subsystem module 100 and the controller subsystem module 200 are each defined by a cargo container housing 300 that is configured for demountable coupling with the roadable flatbed trailer 12. Specifically, in the described embodiment, both the cargo container housings 300 and the roadable flatbed trailer 12 are conventionally configured in accordance with specifications issued by the International Organization of Standards (ISO) for cargo containers, i.e., the dimensions and methods of demountable coupling. In alternative embodiments, the multimedia subsystem module 100, controller subsystem module 200, and mobile base 12 can be configured in any conventional arrangement for demountably coupling the modules 100, 200 to the mobile base 12.

In the described embodiment, the multimedia subsystem module 100 includes a helicopter cockpit 102, and a video display subsystem 400 disposed in combination with the helicopter cockpit 102 for displaying images 106 that provide a simulated helicopter operating environment.

Referring to FIGS. 4, 5, 6, and 7, in the described environment, the video display subsystem 400 comprises a screen assembly 402, projector assembly 404, first mirror assembly 406, and a second mirror assembly 408. The screen assembly 402 comprises a conventional rear projection screen 410 disposed in combination with a frame 412, whereby the frame 412 is coupled with a support truss 414 and plurality of support members 416 using a plurality of conventional shock isolators 418. The support truss 414 and support members 416 are in turn rigidly connected to the cargo container housing 300. In the described embodiment, the shock isolators 418 comprise wire rope isolators provided by Aeroflex International, Inc. In alternative embodiments, the shock isolators 418 can comprise other conventional shock isolators used for isolating vibrations between coupled structures.

During transportation of the mobile modular simulator system 10, the cargo container housing 300 of the multimedia subsystem module 100 is subject to vibratory loads and flexing. In operation, when the cargo container housing 300 flexes, the support truss 414 and support members 416 may experience corresponding flexing. According to the present invention, the interposition of the shock isolators 418 between the support truss 414 and the frame 412, and between the support members 416 and the frame 412, minimizes the transmission of vibratory loads and flexing to the frame 412, and thereby prevents the rear projection screen 410 from warping or fracturing.

In the described embodiment, the projector assembly 404 comprises a video projector 420 coupled to the floor of the cargo container housing 300 using a plurality of shock isolators 422. The shock isolators 422 isolate the video projector 420 from vibratory loads generated during transportation of the mobile modular simulator system 10.

The first mirror assembly 406 comprises a first mirror 424 supported by a support structure 426 coupled to the cargo container housing 300 using a plurality of shock isolators 428. The shock isolators 428 isolate the first mirror 424 from vibratory loads generated during transportation of the mobile modular simulator system 10. In the described embodiment, the first mirror 424 is formed from mylar and is positioned relative to the video projector 420 such that images projected by the video projector 420 are reflected off of the first mirror 424 toward the second mirror assembly 408.

The second mirror assembly 408 comprises a second mirror 430 disposed in combination with an inner frame 432, whereby the inner frame 432 is coupled to an outer frame 434 with a plurality of conventional shock isolators 436. The outer frame 434 is, in turn, rigidly connected to a support truss 438, wherein the support truss 438 is conventionally connected to the cargo container housing 300. According to the present invention, the interposition of the shock isolators 436 between the inner frame 432 and the outer frame 434 minimizes the transmission of vibratory loads and flexing to the inner frame 432, and thereby prevents the second mirror 430 from warping or stretching.

In the described embodiment, the second mirror 430 is formed from mylar and the second mirror assembly 408 is positioned relative to the first mirror assembly 406 and the screen assembly 402 such that the video images projected by the projector assembly 404 onto the first mirror assembly 406 are reflected from the first mirror assembly 406 to the second mirror assembly 408, and are subsequently reflected from the second mirror assembly 408 onto the screen assembly 402.

Figure 3:
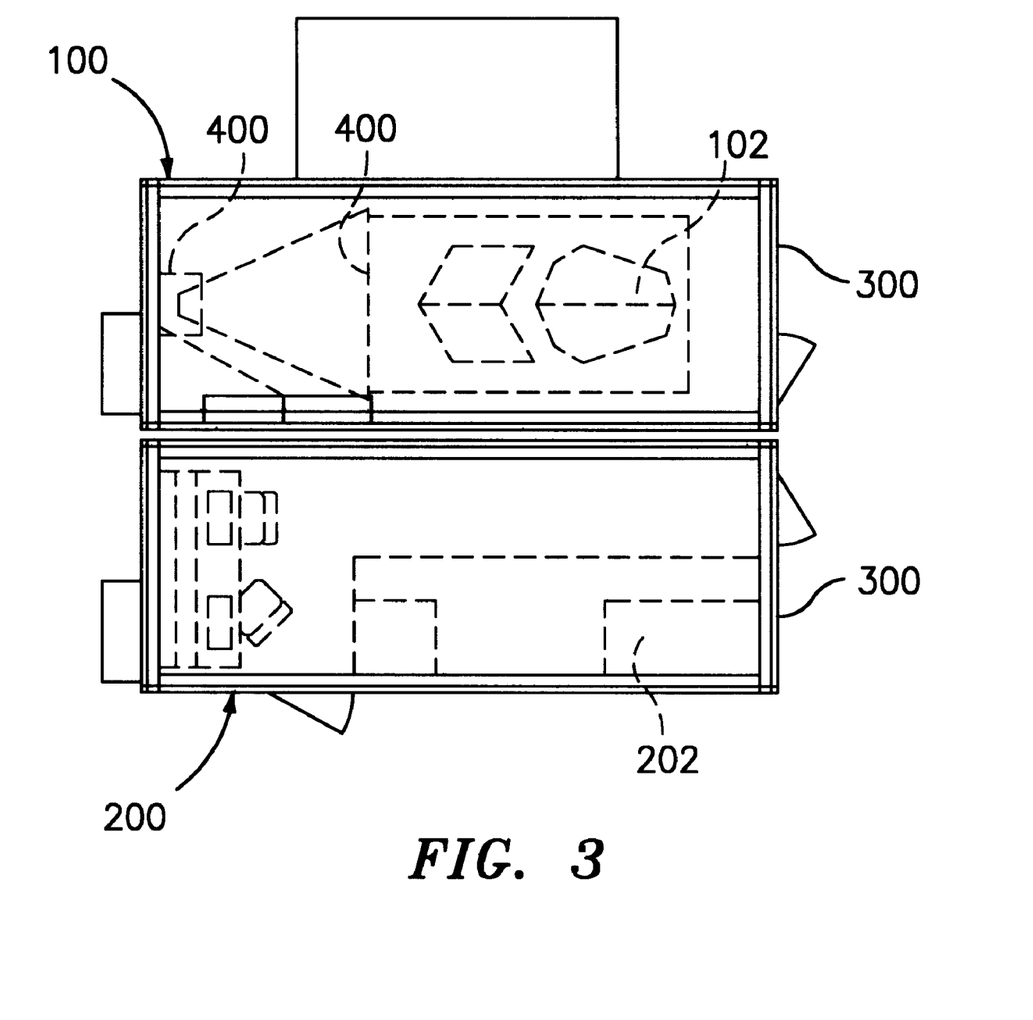
FIG. 3 is a plan view of one configuration of the subsystem modules of FIG. 1.
Figure 4:
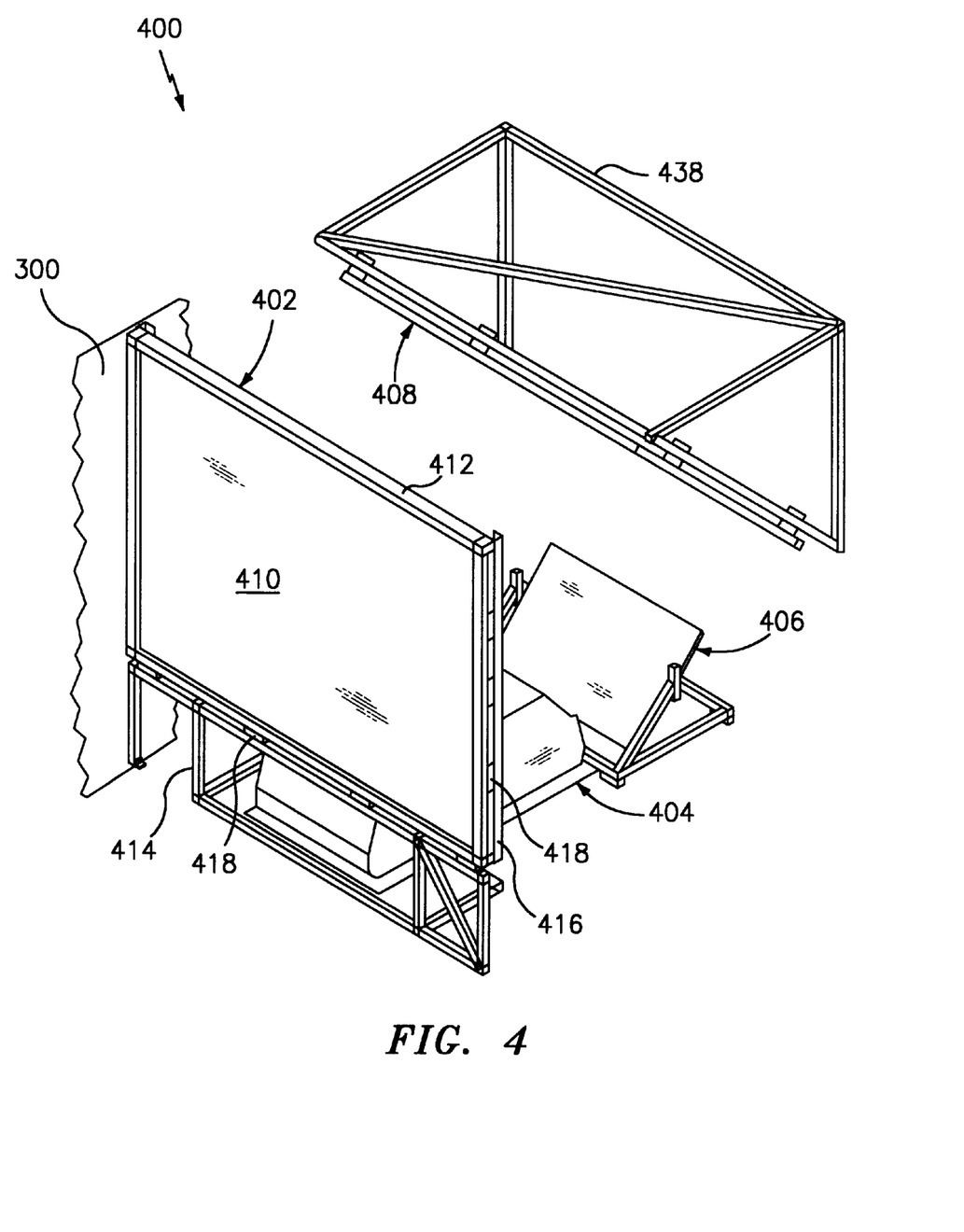
FIG. 4 is a perspective view from the front of the video display subsystem of FIG. 1.
Figure 5:
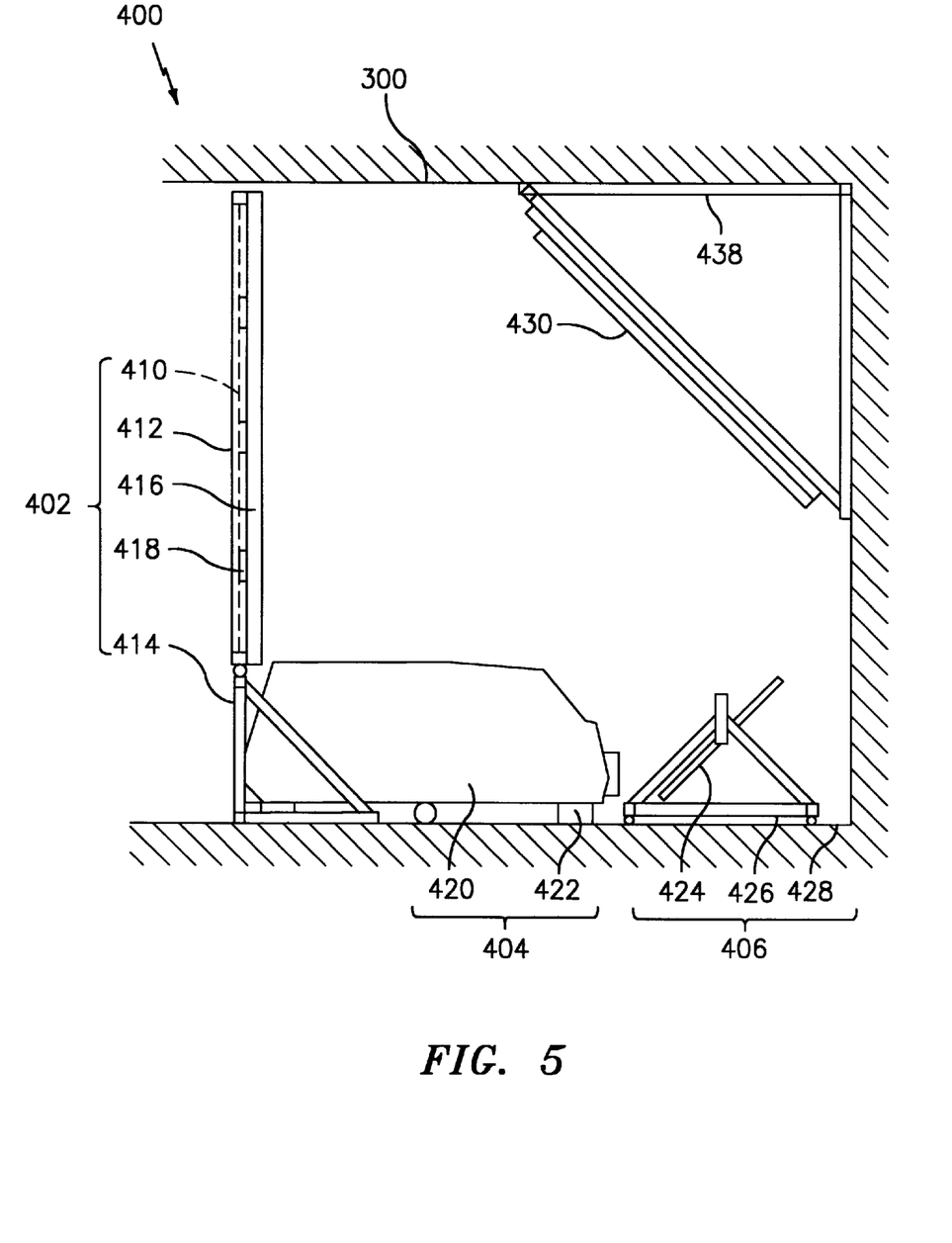
FIG. 5 is a side view of the video display subsystem of FIG. 1.
Figure 6:
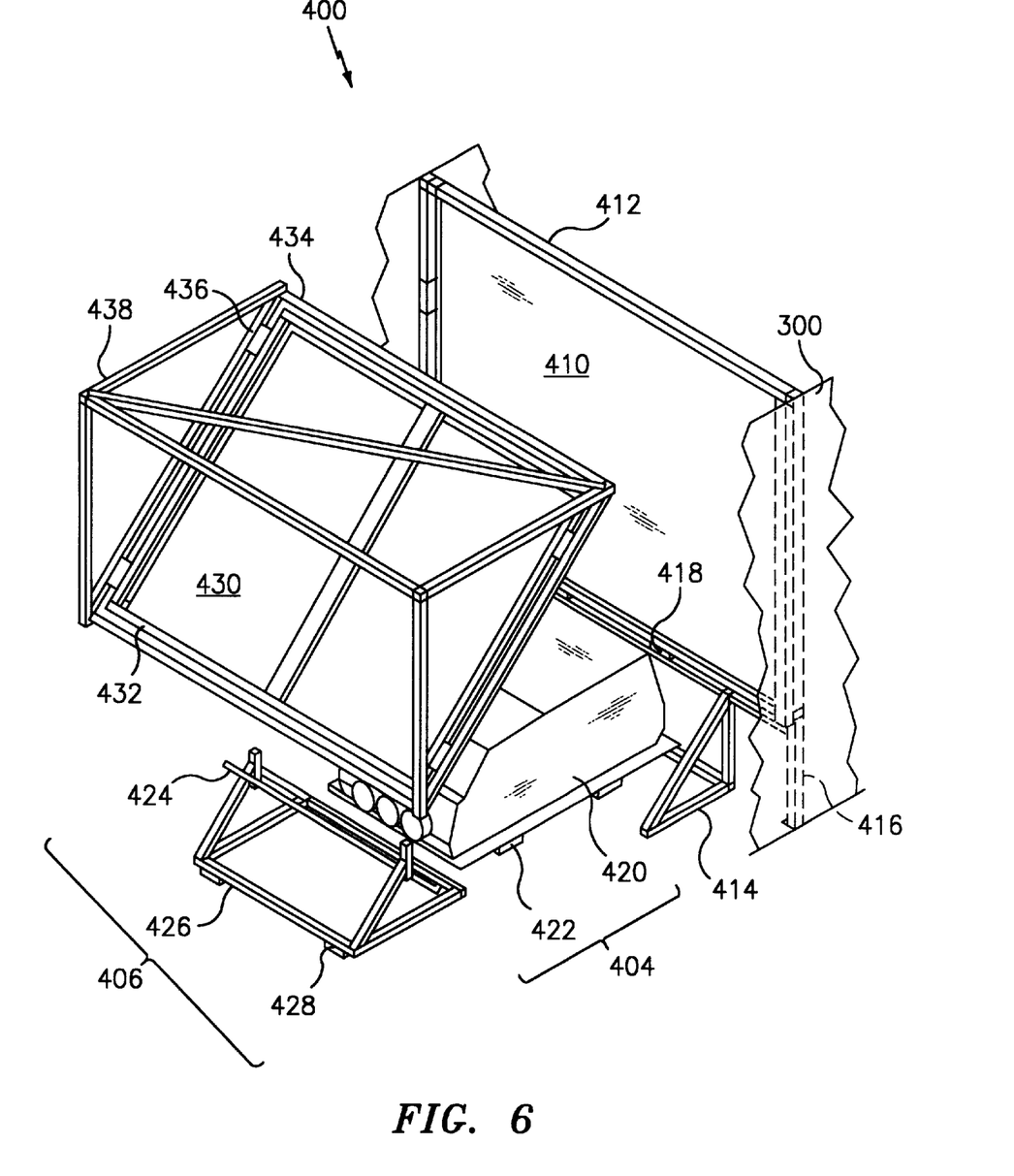
FIG. 6 is a perspective view from the rear of the video display subsystem of FIG. 1.
Figure 7:
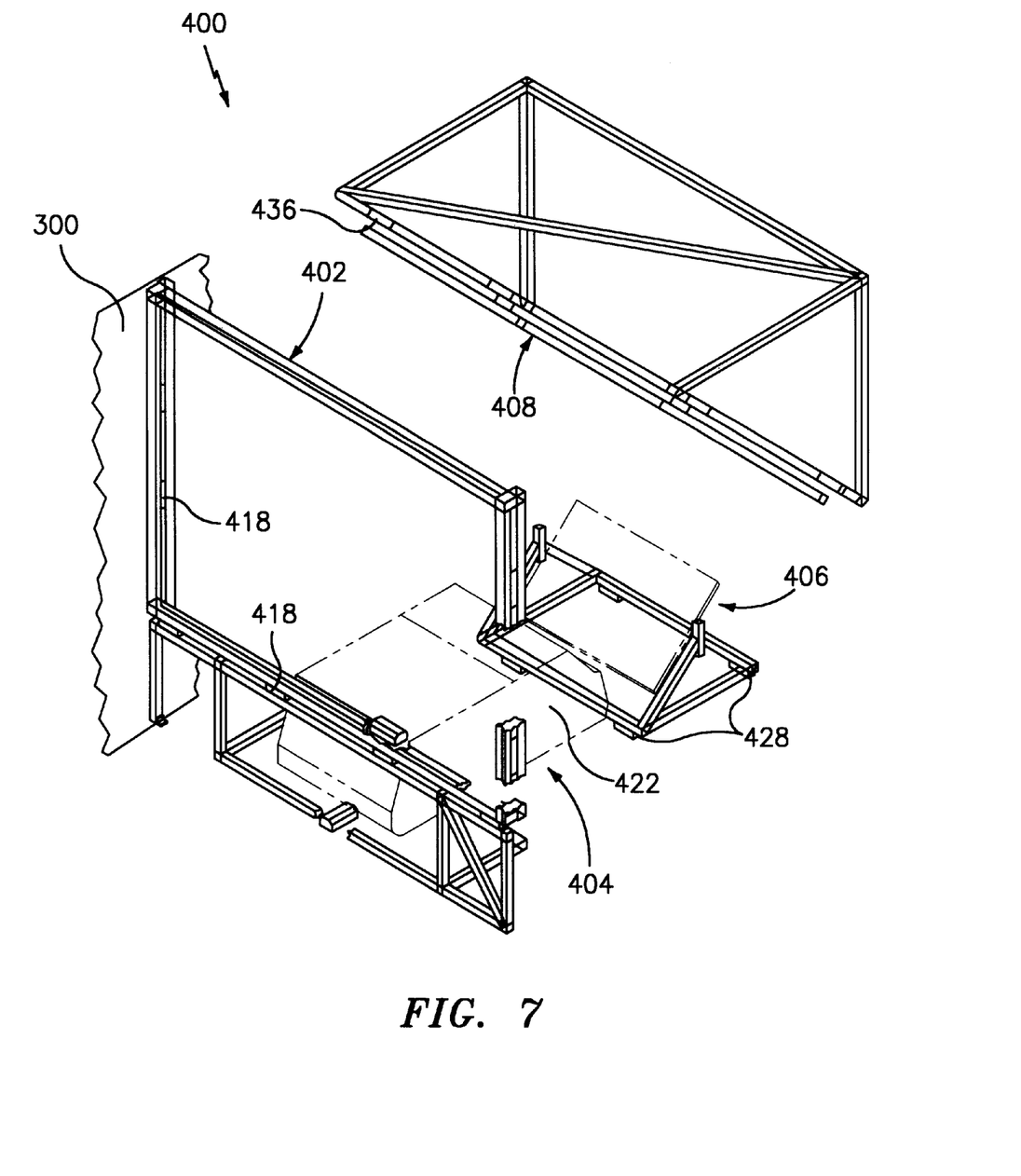
FIG. 7 is a schematic perspective view from the front of the video display subsystem of FIG. 1 depicting the plurality of vibration isolators.

Referring to FIGS. 1–3, in the described embodiment, the multimedia subsystem module 100 further includes an audio delivery subsystem 112 disposed in combination with the video display subsystem 400 for providing audio in combination with the images 106 to enhance the simulated helicopter operating environment experienced by the pilots in the helicopter cockpit 102. Specifically, the audio delivery subsystem 112 comprises conventional speakers for generating the audio.

The controller subsystem module 200 includes a programmable computer 202 configured for receiving input and for delivering output to the components of the multimedia subsystem module 100. In the described embodiment, the programmable computer 202 is electronically coupled to the helicopter cockpit 102, the video display subsystem 400, and the audio delivery subsystem 112 such that the programmable computer 202 is capable of receiving input (e.g., flight control inputs) from the helicopter cockpit 102 and is capable of delivering output in response thereto to the video display subsystem 400 and audio delivery subsystem 112. It will be appreciated that the programmable computer 202 includes conventional hardware and software configured for generating the simulation models, scenarios, images 106, and sounds in response to pilot input to deliver the simulated helicopter operating environment.

In alternative embodiments, the controller subsystem module 200 can include multiple programmable computers or other combinations of hardware and software that are capable of receiving input from the helicopter cockpit 102 and capable of delivering output in response thereto to the video display subsystem 400 and audio delivery subsystem 112.

In the described embodiment, the mobile modular simulator system 10 includes air conditioning units 14, 16 coupled with ducts 18, 20 for providing cool air to the multimedia subsystem module 100 and the controller subsystem module 200. In addition, the mobile modular simulator system 10 includes a generator 22 for providing electrical power to the multimedia subsystem module 100, the controller subsystem module 200, and the air conditioning units 14, 16. In alternative embodiments, external HVAC and electrical sources can be coupled to the multimedia subsystem module 100 and the controller subsystem module 200.

In the described embodiment, as depicted in FIGS. 1 and 2, when the multimedia subsystem module 100 and the controller subsystem module 200 are coupled to the roadable flatbed trailer 12, the modules 100, 200 are longitudinally aligned. When the modules 100, 200 are demounted from roadable flatbed trailer 12, they can be reconfigured in a similar longitudinal alignment (not shown), or in a side-by-side configuration as depicted in FIG. 3. In either configuration, the cargo container housings 300 can include removable panels or doors (not shown) for facilitating movement of individuals from one of the modules 100, 200 to the other.

It will be appreciated that the modular nature of the mobile modular simulator system 10 facilitates the removal of the multimedia subsystem module 100, the controller subsystem module 200, or both from the mobile base 12, and facilitates the replacement therefor with different multimedia subsystem modules 100 or controller subsystem modules 200.

In alternative embodiments, the helicopter cockpit 102 in the multimedia subsystem module 100 can be replaced with an aircraft cockpit, tank cockpit, vehicle interior, or any other type of control center for an airborne, seafaring, or land-based vehicle. In yet other alternative environments, the multimedia subsystem module 100 can contain any internal arrangement necessary for a variety of simulation or training environments, including police and military personnel training. It will be appreciated that for these alternative configurations of the multimedia subsystem module 100, the controller subsystem module 200 can be reprogrammed or replaced to provide the appropriate corresponding simulation environment.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A video display system for a mobile simulator, comprising:
    (a) a shock-isolated projector assembly for projecting video images;
    (b) a shock-isolated first mirror assembly disposed in combination with said projector assembly;
    (c) a shock-isolated second mirror assembly disposed in combination with said first mirror assembly; and
    (d) a shock-isolated screen assembly disposed in combination with said second mirror assembly;
    (e) wherein said projector assembly, said first mirror assembly, said second mirror assembly, and said screen assembly are configured, in combination, such that said video images projected by said projector assembly are directed to said first mirror assembly, are reflected from said first mirror assembly to said second mirror assembly, and are subsequently reflected from said second mirror assembly onto said screen assembly.

2. The video display system of claim 1, wherein said mobile simulator is defined by a cargo container housing, and wherein said shock-isolated projector assembly comprises:
    (a) a video projector; and
    (b) a plurality of shock isolators for coupling said video projector with said cargo container housing.

3. The video display system of claim 1, wherein said mobile simulator is defined by a cargo container housing, and wherein said shock-isolated first mirror assembly comprises:
    (a) a first mirror;
    (b) a support truss configured for supporting said first mirror; and
    (c) a plurality of shock isolators for coupling said support truss to said cargo container housing.

4. The video display system of claim 1, wherein said mobile simulator is defined by a cargo container housing, and wherein said shock-isolated second mirror assembly comprises:
    (a) a second mirror;
    (b) an inner frame disposed in combination with said second mirror;
    (c) an outer frame configured for supporting said inner frame;
    (d) a plurality of shock isolators for coupling said outer frame to said inner frame; and
    (e) a support truss connected to said outer frame for supporting said outer frame, said support truss being connected to said cargo container housing.

5. The video display system of claim 1, wherein said mobile simulator is defined by a cargo container housing, and wherein said shock-isolated screen assembly comprises:
    (a) a rear projection screen;
    (b) a frame disposed in combination with said rear projection screen;
    (c) a support truss configured for supporting said frame, said support truss being connected to said cargo container housing;
    (d) a plurality of support members for supporting said frame, said support members being connected to said cargo container housing; and
    (e) a plurality of shock isolators for coupling said support truss to said frame, and for coupling said plurality of support members to said frame.

* * * * *